US006567013B1

(12) United States Patent
Purkis et al.

(10) Patent No.: US 6,567,013 B1
(45) Date of Patent: May 20, 2003

(54) DIGITAL HYDRAULIC WELL CONTROL SYSTEM

(75) Inventors: Daniel G. Purkis, Cruden Bay (GB); Brett W. Bouldin, Spring, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/510,701

(22) Filed: Feb. 22, 2000

Related U.S. Application Data

(63) Continuation-in-part of application No. 09/133,747, filed on Aug. 13, 1998, now Pat. No. 6,179,052.

(51) Int. Cl.[7] .................................................. G01V 3/00

(52) U.S. Cl. ............................... 340/854.3; 340/855.5; 166/374; 166/375; 166/72; 166/319

(58) Field of Search ........................... 340/853.5, 854.3, 340/855.3; 166/53, 72, 319, 374, 375

(56) References Cited

U.S. PATENT DOCUMENTS 3,702,909 A 11/1972 Kraakuan
3,906,726 A 9/1975 Jameson
3,970,144 A 7/1976 Boykin, Jr.
3,993,100 A 11/1976 Pollard et al.
4,036,106 A 7/1977 Athy, Jr.
4,197,879 A 4/1980 Young
4,234,043 A 11/1980 Roberts
4,296,910 A 10/1981 Gratzmuller
4,347,900 A 9/1982 Barrington
4,368,871 A 1/1983 Young
4,371,753 A * 2/1983 Graf ........................... 137/814
4,407,183 A 10/1983 Milberger et al.
4,442,902 A 4/1984 Doremus et al.
4,476,933 A 10/1984 Brooks
4,522,370 A 6/1985 Noack et al.
4,549,578 A 10/1985 Hibbs et al.
4,660,647 A 4/1987 Richart
4,796,699 A 1/1989 Upchurch
4,942,926 A 7/1990 Lessi
4,945,995 A 8/1990 Tholance et al.
5,065,825 A 11/1991 Bardin et al.
5,174,189 A * 12/1992 Kamimura .................. 91/446
5,176,164 A 1/1993 Boyle
5,522,465 A 6/1996 Deare
5,547,029 A 8/1996 Rubbo et al.
5,887,654 A * 3/1999 Edwards et al. ............ 166/297
5,906,220 A 5/1999 Thompson
5,975,204 A 11/1999 Tubel et al.
6,179,052 B1 1/2001 Purkis et al.

FOREIGN PATENT DOCUMENTS

EP 0344060 A 11/1989
FR 2052052 A 4/1971
GB 2335216 A 9/1999
WO WO 97/47852 12/1997
WO WO 98 39547 A 9/1998
WO WO 99/47788 9/1999
WO WO 00/09855 2/2000

OTHER PUBLICATIONS

U.S. Patent Application Ser. No. 09/133,747 PCT/GB99/02694.

* cited by examiner

*Primary Examiner*—Michael Horabik
*Assistant Examiner*—Albert K. Wong
(74) *Attorney, Agent, or Firm*—Marlin R. Smith

(57) ABSTRACT

A well control system and associated method of controlling well tools provides downhole well tool control without requiring the use of electricity or complex pressure pulse decoding mechanisms. In a described embodiment, a digital hydraulic well control system includes multiple well tool assemblies, with each assembly including a well tool, an actuator and an addressable actuation control device. Multiple hydraulic lines are interconnected to each control device. The hydraulic lines transmit addresses or codes to respective selected ones of the control devices, thereby selecting corresponding respective ones of the well tools for actuation thereof. Hydraulic lines are also used to actuate the selected well tools.

45 Claims, 6 Drawing Sheets

DIGITAL HYDRAULIC WELL CONTROL SYSTEM

CROSS-REFERENCE TO RELATED APPLICATION

This application is a continuation-in-part of application Ser. No. 09/133,747, filed Aug. 13, 1998 now U.S. Pat. No. 6,179,052, the disclosure of which is incorporated herein by this reference.

BACKGROUND OF THE INVENTION

The present invention relates generally to operations performed in conjunction with subterranean wells and, in an embodiment described herein, more particularly provides a well control system utilizing digital hydraulics.

It is very advantageous to be able to independently control well tools from the earth's surface, or other remote location. For example, production from one of several zones intersected by a well may be halted due to water invasion, while production continues from the other zones. Alternatively, one zone may be in communication with a production tubing string, while the other zones are shut in.

In order to control multiple downhole well tools, various systems have been proposed and used. One type of system utilizes electrical signals to select from among multiple well tools for operation of the selected tool or tools. Another type of system utilizes pressure pulses on hydraulic lines, with the pulses being counted by the individual tools, to select particular tools for operation thereof.

Unfortunately, these systems suffer from fundamental disadvantages. The systems which use electrical communication or power to select or actuate a downhole tool typically have temperature limitations or are prone to conductivity and insulation problems, particularly where integrated circuits are utilized or connectors are exposed to well fluids. The systems which use pressure pulses are typically very complex and, therefore, very expensive and susceptible to failure.

From the foregoing, it can be seen that it would be quite desirable to provide a well control system which does not use electricity or complex pressure pulse counting mechanisms, but which provides a reliable, simple and cost effective means of controlling downhole tools. It is accordingly an object of the present invention to provide such a well control system and associated methods of controlling well tools.

SUMMARY OF THE INVENTION

In carrying out the principles of the present invention, in accordance with an embodiment thereof, a digital hydraulic well control system is provided which utilizes hydraulic lines to select one or more well tools for operation thereof, and which utilizes hydraulic lines to actuate the selected well tool(s). The use of electricity downhole is not required, nor is use of complex pressure pulse decoding mechanisms required. Instead, the digital hydraulic well control system utilizes a combination of pressure levels on the hydraulic lines to select a well tool for actuation, and uses pressure in one or more hydraulic lines to actuate the tool.

In one aspect of the present invention, a method of hydraulically controlling multiple well tools in a well is provided. A set of hydraulic lines is interconnected to each of the tools. At least one of the tools is selected for actuation thereof by generating a code on the set of hydraulic lines.

The code is a combination of pressure levels on the set of hydraulic lines. For example, one or more of the hydraulic lines may have a certain pressure level, while other hydraulic lines have another pressure level. Pressure pulses are not used.

The code corresponds to an address of one or more actuation control devices. For example, each well tool may have an actuation control device associated therewith. When a certain code is transmitted by the hydraulic lines, and the code matches the address of one or more of the actuation control devices, the corresponding tool(s) are selected for actuation thereof.

When a well tool has been selected for actuation, fluid pressure in one or more of the hydraulic lines may be used to operate the well tool. The hydraulic line used to operate the tool may be one of the hydraulic lines also used to select the tool for actuation, or it may be another hydraulic line. If the hydraulic line used to operate the tool is one of the hydraulic lines used to select the tool for actuation, a change in fluid pressure in that line may be all that is needed to cause the tool to actuate.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
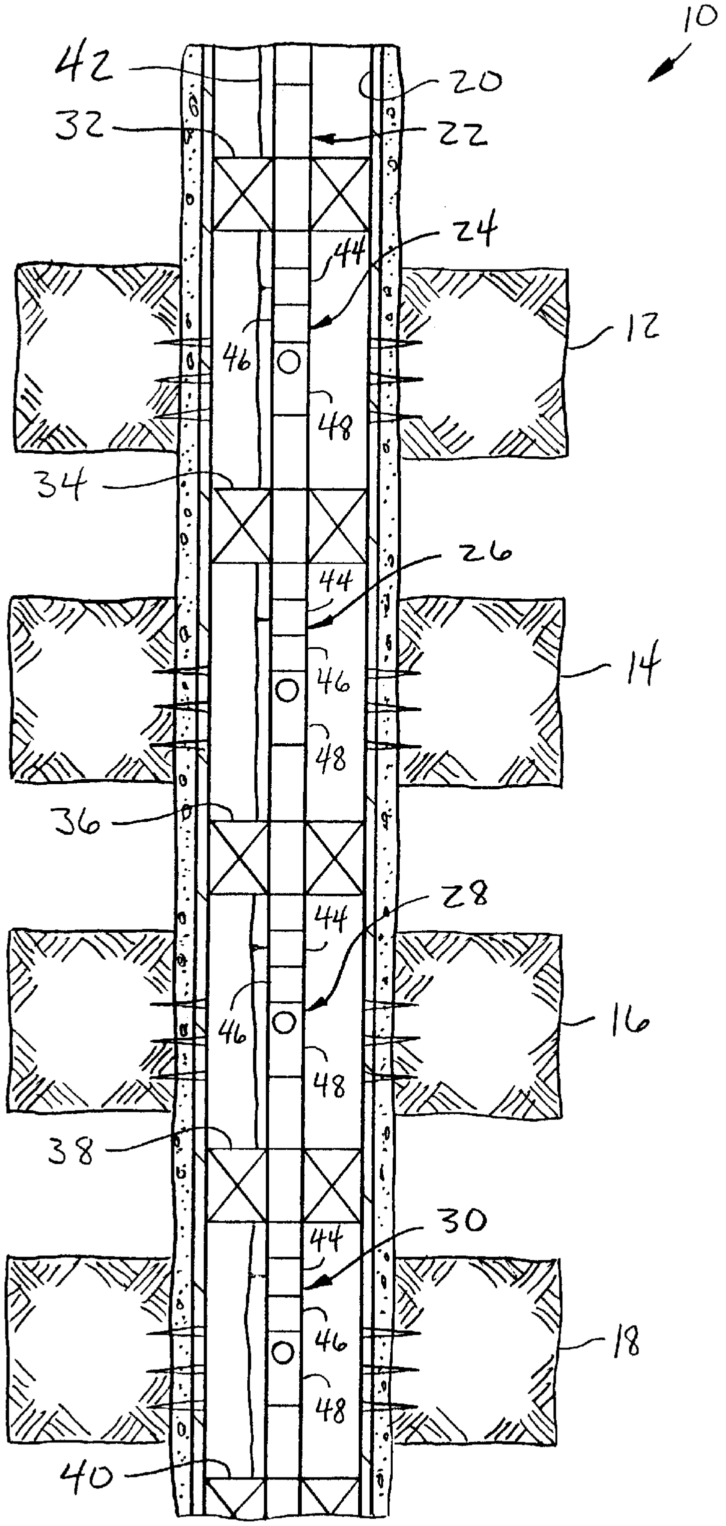
FIG. 1 is a schematic view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", "right", "left", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

In the method 10 as depicted in FIG. 1, four subterranean zones 12, 14, 16, 18 are intersected by a wellbore 20. The following description of the method 10 assumes that it is desired to produce fluid to the earth's surface from one or more of the zones 12, 14, 16, 18 via a production tubing string 22. However, it is to be clearly understood that the principles of the present invention are not limited to production wells, production from multiple zones, or any of the specific details of the method 10 as described herein. For example, principles of the present invention may be used in injection wells, in wells where fluid flow from, or into, a single formation is to be controlled, in methods where an aspect of the well other than fluid flow is to be controlled, etc. Thus, the method 10 is described herein as merely an example of the wide variety of uses for the principles of the present invention.

The production tubing string 22 as depicted in FIG. 1 includes four well tool assemblies 24, 26, 28, 30. The tubing string 22 also includes packers 32, 34, 36, 38, 40 isolating the zones 12, 14, 16, 18 from each other and from portions of the wellbore 20, according to conventional practice. Representatively, the tool assemblies 24, 26, 28, 30 are valve assemblies used to permit or prevent fluid flow between the zones 12, 14, 16, 18 and the interior of the tubing string 22, but it is to be clearly understood that the tool assemblies could include other types of well tools, such as chokes, injectors, instruments, etc.

To permit production of fluid from zone 12, valve assembly 24 is opened, thereby permitting fluid communication between the tubing string 22 and the wellbore 20 between packers 32 and 34. To prevent production of fluid from zone 12, valve assembly 24 is closed, thereby preventing fluid communication between the tubing string 22 and the wellbore 20 between packers 32 and 34. Similarly, the other valve assemblies 26, 28, 30 may be used to permit or prevent production of fluid from the respective zones 14, 16, 18.

Actuation of the valve assemblies 24, 26, 28, 30 is accomplished by means of hydraulic lines 42 interconnected to each of the valve assemblies. The hydraulic lines 42 extend to the earth's surface, or another remote location, where fluid pressure on each of the lines may be controlled using conventional pumps, valves, accumulators, computerized controls, etc. In one important aspect of the present invention, one or more of the lines 42 may also be used to select one or more of the valve assemblies 24, 26, 28, 30 for actuation thereof.

Each of the valve assemblies 24, 26, 28, 30 includes an addressable control device 44, an actuator 46 and a valve 48 or other well tool. The hydraulic lines 42 are interconnected to each of the control devices 44. Each of the control devices 44 has at least one address, and multiple ones of the control devices may have the same address. When a combination of pressure levels on certain ones of the hydraulic lines 42 matches an address of one of the control devices 44, the corresponding valve assembly 24, 26, 28 and/or 30 is selected for actuation thereof.

When a valve assembly 24, 26, 28 and/or 30 is selected, fluid pressure on one or more of the hydraulic lines 42 may then be used to actuate the selected assembly or assemblies. Thus, the method 10 does not require the use of electricity downhole to select or actuate any of the valve assemblies 24, 26, 28 or 30, and does not require a series of pressure pulses to be decoded at each of the assemblies. Instead, the method 10 is performed conveniently and reliably by merely generating a combination of pressure levels on certain ones of the hydraulic lines 42 to address the desired control device (s) 44, and utilizing fluid pressure on one or more of the hydraulic lines to actuate the corresponding selected well tool(s) 48. The specific hydraulic lines used to select the tool assembly or assemblies for actuation thereof may or may not also be used to actuate the selected assembly or assemblies.

Figure 2:
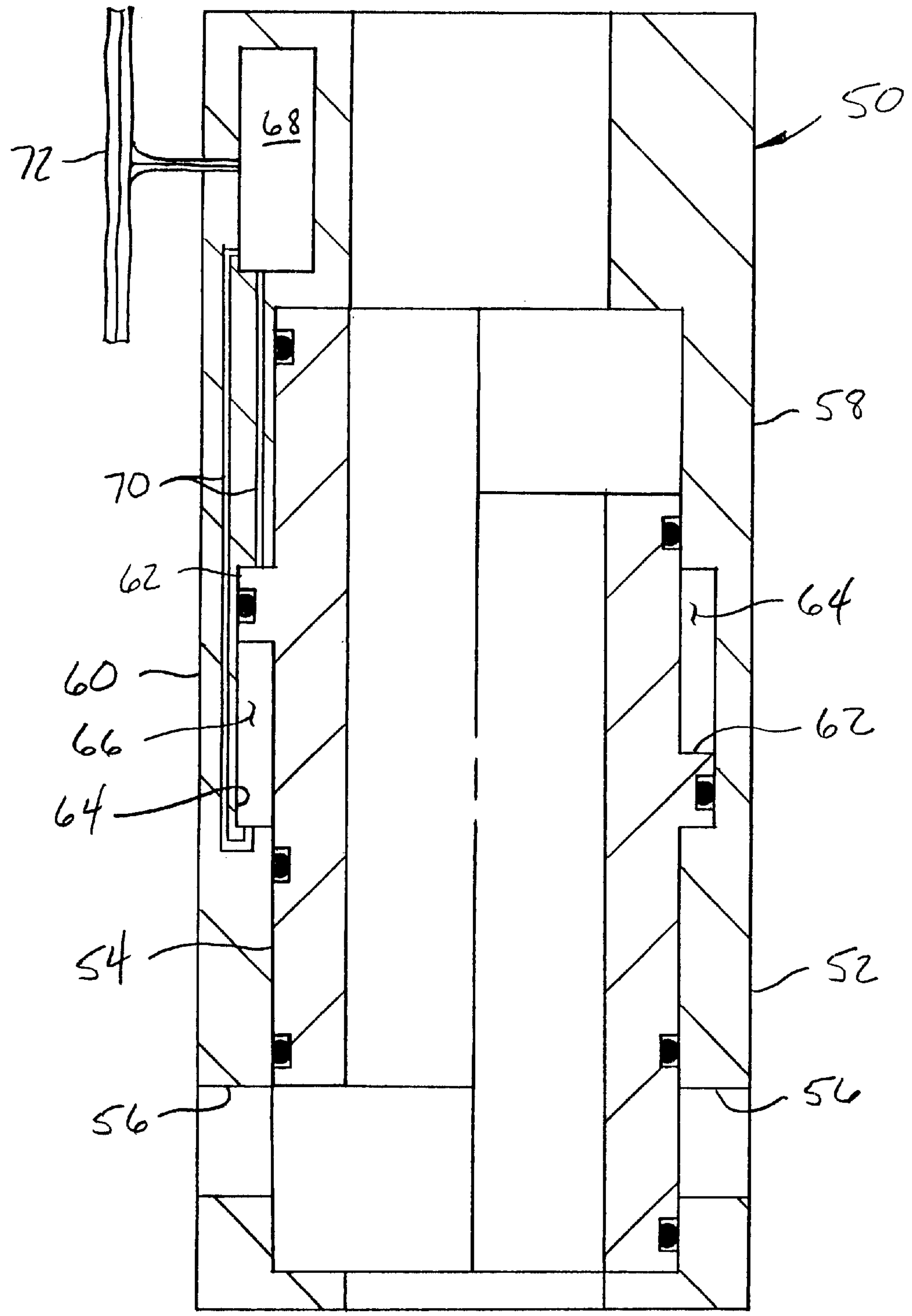
FIG. 2 is a schematic cross-sectional view of a well tool that may be used in the method of FIG. 1.

Referring additionally now to FIG. 2, a valve assembly 50 is schematically and representatively illustrated. The valve assembly 50 may be used for one of the tool assemblies 24, 26, 28, 30 in the method 10. Of course, other valve assemblies and other types of tool assemblies may be used in the method 10, and the valve assembly 50 may be configured differently from that shown in FIG. 2, without departing from the principles of the present invention.

The valve assembly 50 includes a valve portion 52 which is of the type well known to those skilled in the art as a sliding sleeve valve. Thus, the valve portion 52 includes an inner sleeve 54 which is displaced upwardly or downwardly to thereby permit or prevent fluid flow through ports 56 formed radially through an outer housing 58. The housing 58 may be interconnected in the tubing string 22 of the method 10 by, for example, providing appropriate conventional threads thereon.

The sleeve 54 is caused to displace by fluid pressure in an actuator portion 60 of the valve assembly 50. The actuator portion 60 includes a part of the sleeve 54 which has a radially enlarged piston 62 formed thereon. The piston 62 reciprocates within a radially enlarged bore 64 formed in the housing 58. The piston 62 separates an upper chamber 64 from a lower chamber 66, with the chambers being formed radially between the sleeve 54 and the housing 58.

On the left side of FIG. 2, the valve assembly 50 is depicted with the sleeve 54 in its upwardly displaced position, permitting fluid flow through the ports 56. On the right side of FIG. 2, the valve assembly 50 is depicted with the sleeve 54 in its downwardly displaced position, preventing fluid flow through the ports 56. It will be readily appreciated by one skilled in the art that the sleeve 54 is biased to its upwardly displaced position by fluid pressure in the lower chamber 66 exceeding fluid pressure in the upper chamber 64. Similarly, the sleeve 54 is biased to its downwardly displaced position by fluid pressure in the upper chamber 64 exceeding fluid pressure in the lower chamber 66.

Fluid pressure in the chambers 64, 66 is controlled, at least in part, by an addressable actuation control device 68. The control device 68 is in fluid communication with the chambers 64, 66 using passages 70. Additionally, the control device 68 is interconnected to external hydraulic lines 72. When used in the method 10, the valve assembly 50 maybe one of multiple well tool assemblies with corresponding control devices 68 interconnected to the hydraulic lines 72.

The control device 68 functions to permit fluid communication between the passages 70 and certain ones of the hydraulic lines 72 when a code or address is present on the hydraulic lines, which code corresponds to an address of the control device. The term "code" is used herein to indicate a combination of pressure levels on a set of hydraulic lines. For example, 1,000 psi may be present on certain ones of the hydraulic lines 72, and 0 psi may be present on others of the hydraulic lines to thereby transmit a particular code corresponding to an address of the control device 68.

Preferably, the pressure levels are static when the code is generated on the hydraulic lines 72, however, it is recognized that, due to the long distances which may be involved in positioning well tools in wells, the fact that a desired fluid pressure may not be instantly generated on a given hydraulic line, etc., a period of time is required to generate the code on the hydraulic lines. Nevertheless, it will be readily appreciated by one skilled in the art that this method of transmitting a code or address via the hydraulic lines 72 is substantially different, and far easier to accomplish, as compared to applying a series of pressure pulses on a hydraulic line. In the latter case, for example, pressure on a hydraulic line is intentionally increased and decreased repeatedly, and a code or address is not generated on multiple hydraulic lines, but is instead generated on a single hydraulic line.

Figure 3:
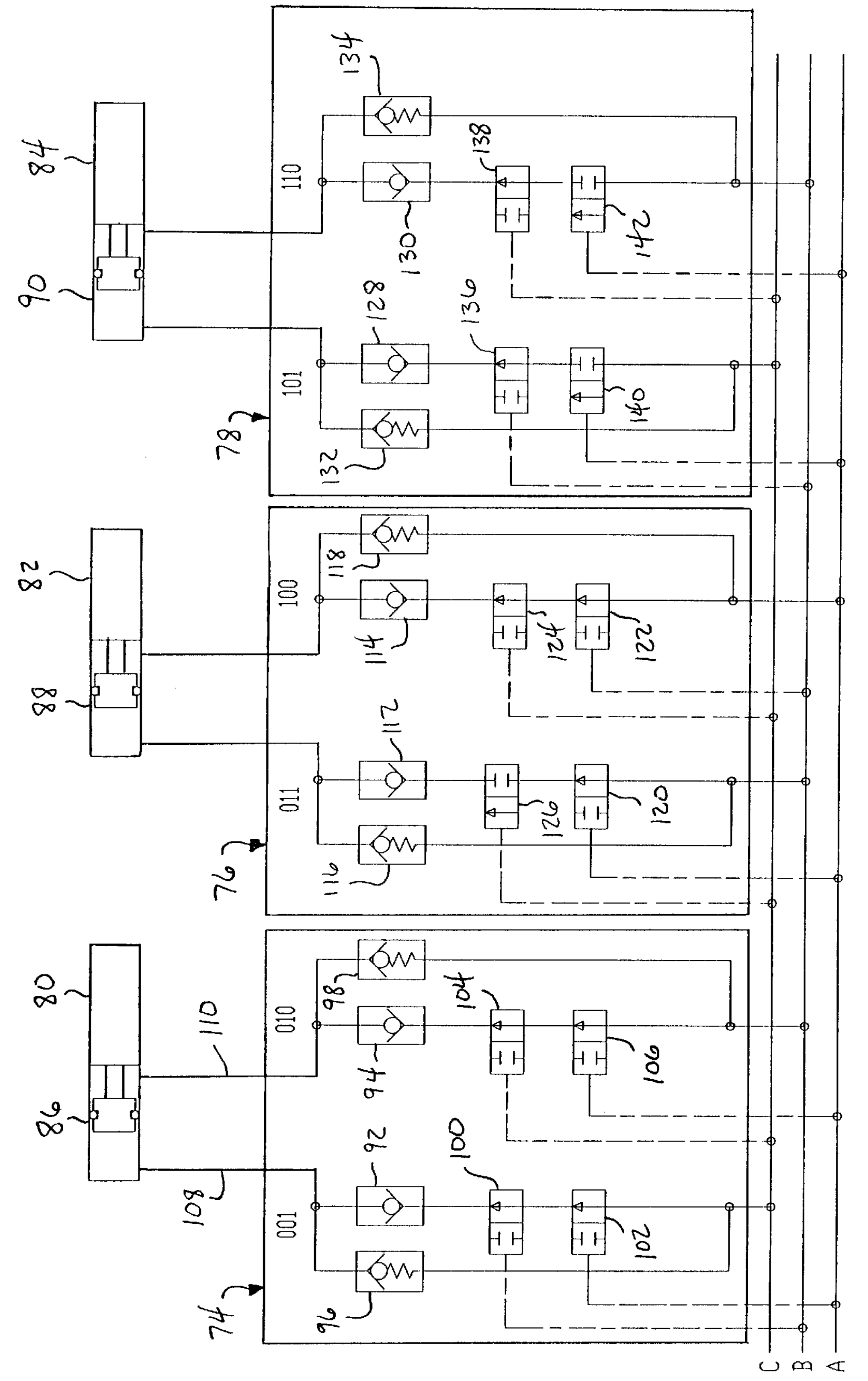
FIG. 3 is a hydraulic schematic of a first well control system embodying principles of the present invention.

Referring additionally now to FIG. 3, a well control system hydraulic schematic is representatively illustrated. The schematic depicts three addressable actuation control devices 74, 76, 78 utilized to control actuation of three corresponding well tools 80, 82, 84 via respective actuators 86, 88, 90. The well tools 80, 82, 84 may be valves, such as valve 52 or valves 48 in the method 10, or they may be another type of well tool. The actuators 86, 88, 90 may be similar to the actuator 60 of the valve assembly 50, and may be used for the actuators 46 in the method 10, or they may be differently configured. Similarly, the control devices 74, 76, 78 may correspond to the control device 68 or the control devices 44 in the method 10.

Figure 4:
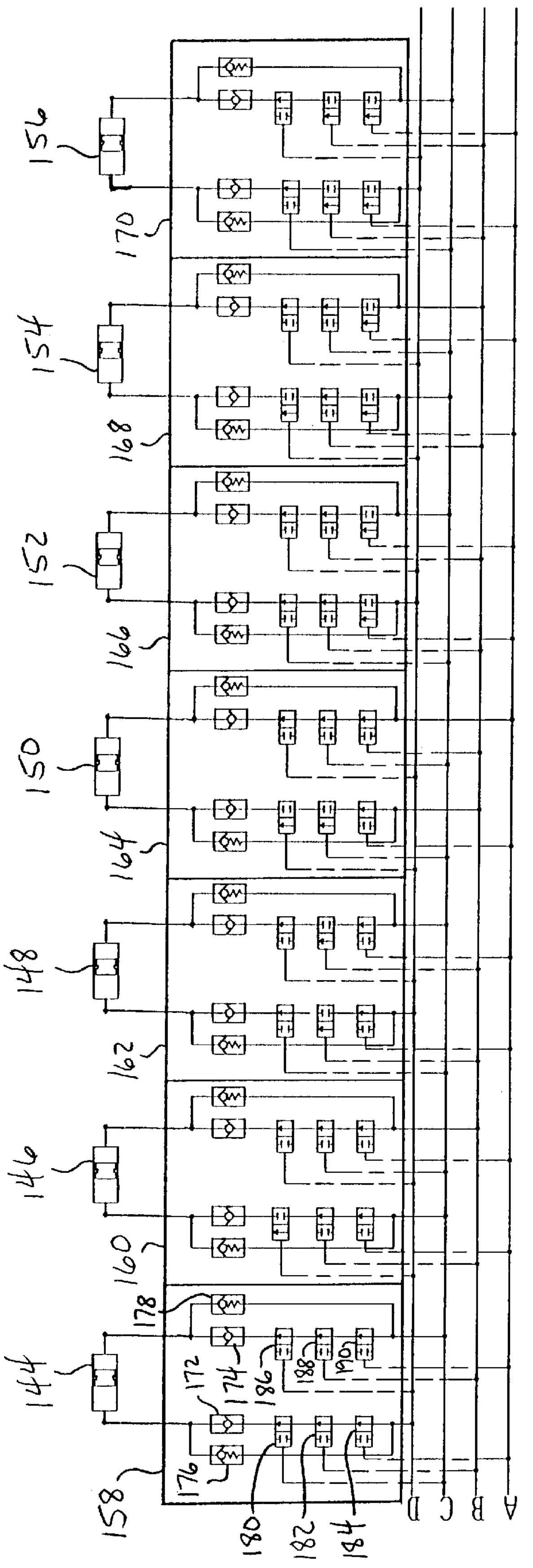
FIG. 4 is a hydraulic schematic of a second well control system embodying principles of the present invention.
Figure 5:
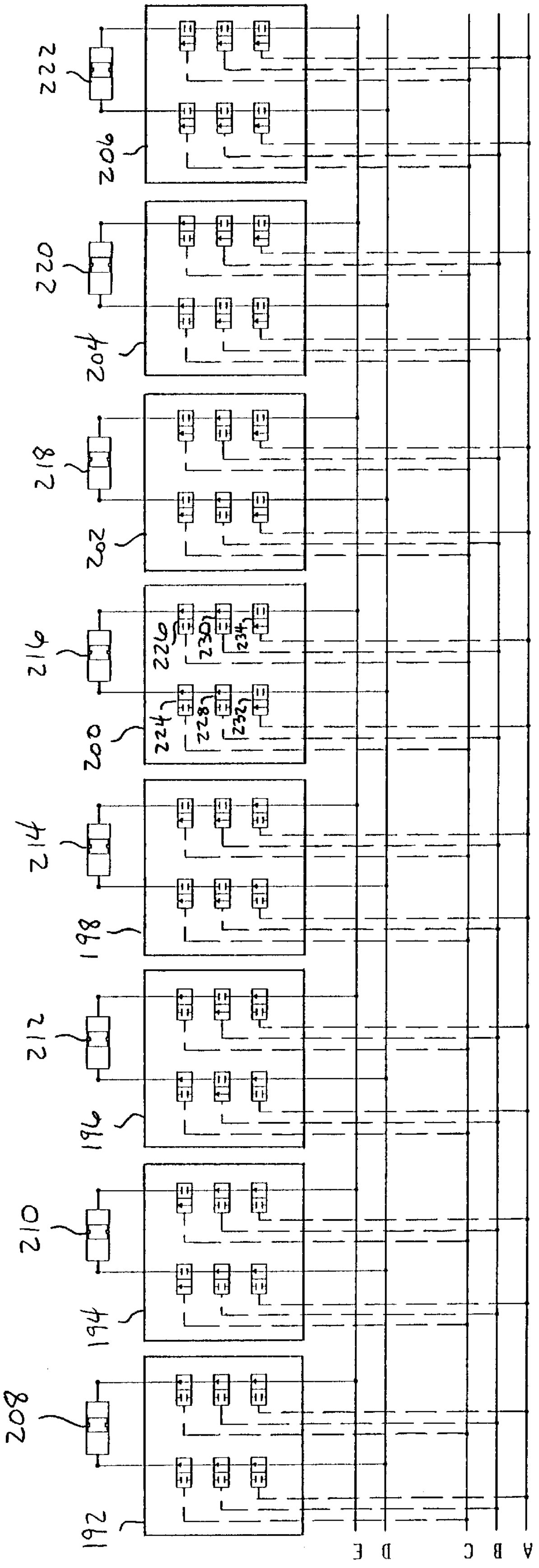
FIG. 5 is a hydraulic schematic of a third well control system embodying principles of the present invention.
Figure 6:
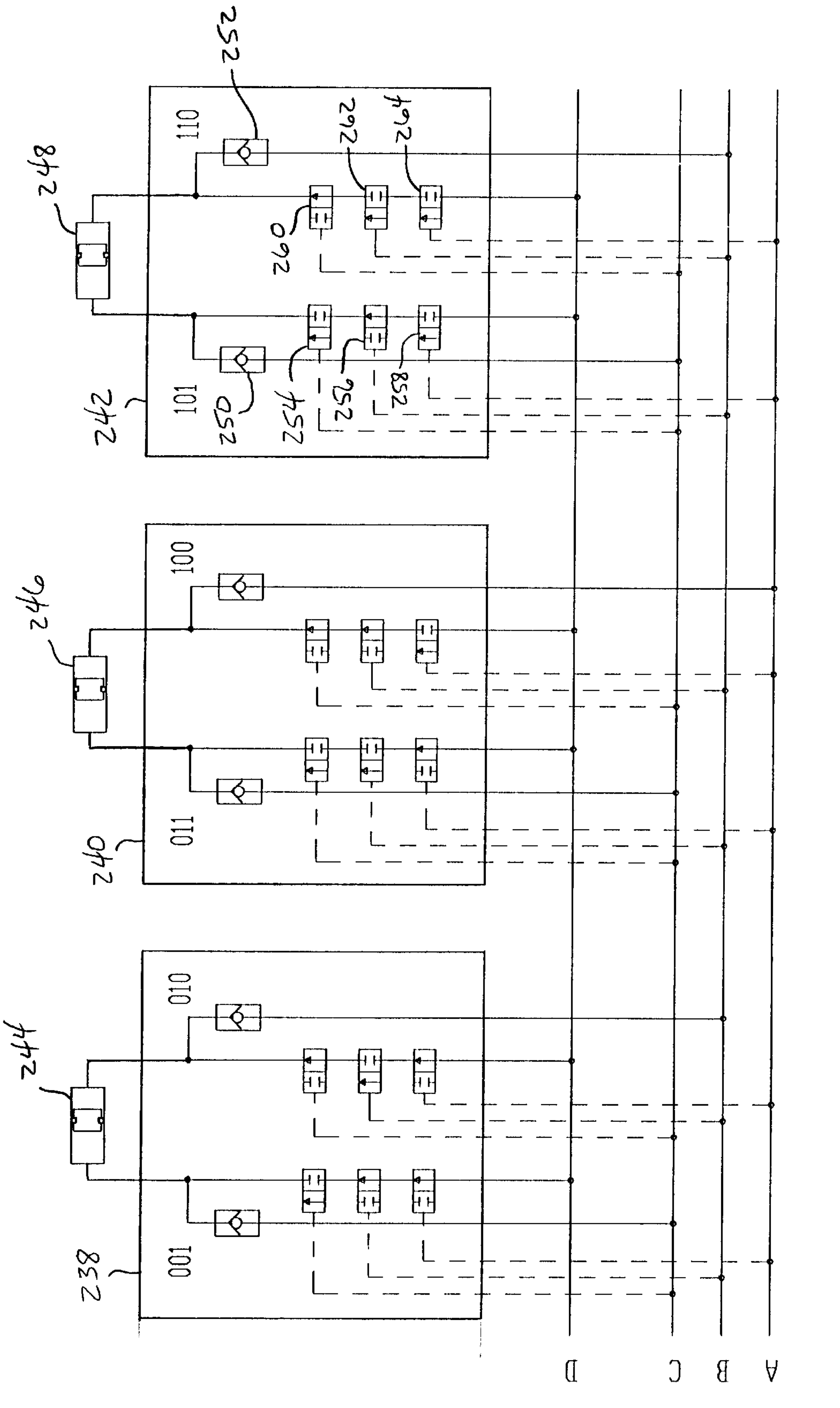
FIG. 6 is a hydraulic schematic of a fourth well control system embodying principles of the present invention.

The hydraulic schematic shown in FIG. 3 is described herein as an example of the manner in which the principles of the present invention provide convenient, simple and reliable control over the operation of multiple well tool assemblies in a well. However, it is to be clearly understood that principles of the present invention may be incorporated into other methods of controlling well tools and, demonstrating that fact, alternate hydraulic schematics are illustrated in FIGS. 4–6 and are described below. Therefore, it may be seen that the descriptions of specific hydraulic schematics herein are not to be taken as limiting the principles of the present invention.

The hydraulic schematic of FIG. 3 demonstrates a manner in which three hydraulic lines (labelled A, B and C in the schematic) may be used in controlling actuation of multiple downhole well tools 80, 82, 84. For the purpose of this example, each of the control devices 74, 76, 78 has been configured to have two addresses. The control device 74 has addresses 001 and 010, the control device 76 has addresses 011 and 100, and the control device 78 has addresses 101 and 110. It will be readily appreciated that these addresses are similar to the type of notation used in digital electronics and sometimes referred to as binary code. In binary code, 1's and 0's are used to refer to the presence or absence of voltage, a state of charge, etc. on elements of an electronic device. In the present description of the hydraulic schematic, the 1's and 0's are used to indicate the presence or absence of a predetermined pressure level on a hydraulic line.

Using one of the addresses, 001, of the control device 74 as an example, the first 0 refers to the absence of the pressure level on hydraulic line A. The second 0 refers to the absence of the pressure level on hydraulic line B. The 1 refers to the presence of the pressure level on hydraulic line C. Therefore, the control device 74 is addressed or selected for control of actuation of the tool 80 by generating the code 001 on the hydraulic lines A, B, C (i.e., the absence of the pressure level on lines A and B, and the presence of the pressure level on line C).

Note that the control device 74 as depicted in FIG. 3 has two addresses, 001 and 010. The use of multiple addresses in the control device 74 permits the use of multiple ways of actuating the tool 80. For example, if the tool 80 is a valve, address 001 may be used to open the valve, and address 010 may be used to close the valve. Of course, more than one of the control devices 74, 76, 78 could have the same address. For example, each of the control devices 74, 76, 78 could have the address 001, so that when this code is generated on the hydraulic lines A, B, C, each of the tools 80, 82, 84 is selected for actuation in the same manner. If the tools 80, 82, 84 are all valves, for example, the code 001 generated on the hydraulic lines A, B, C could select each of the control devices 74, 76, 78 so that all of the valves are to be closed.

For convenience in the further description of the hydraulic schematic depicted in FIG. 3, the tools 80, 82, 84 are assumed to be valves and the predetermined pressure level corresponding to a "1" in the control device addresses is assumed to be 1,000 psi. However, it is to be clearly understood that the tools 80, 82, 84 are not necessarily valves, and the predetermined pressure level may be other than 1,000 psi, without departing from the principles of the present invention. Using these assumptions and the addresses shown in FIG. 3, the following table is given as an example of the manner in which actuation of the valves 80, 82, 84 maybe selected using the addresses:

| Address A B C | Actuation |
|---|---|
| 0 0 1 | Open Valve 80 |
| 0 1 0 | Close Valve 80 |
| 0 1 1 | Open Valve 82 |
| 1 0 0 | Close Valve 82 |
| 1 0 1 | Open Valve 84 |
| 1 1 0 | Close Valve 84 |

From the above, it may be readily appreciated that all of the valves 80, 82, 84 may be easily selected for actuation to either a closed or open configuration by merely generating a predetermined pressure level, such as 1,000 psi, on certain ones of the hydraulic lines A, B, C. Furthermore, each of the above addresses is unique, so that only one of the valves is selected for actuation at one time, thereby permitting independent control of each of the valves 80, 82, 84. However, as noted above, it may be desired to have multiple ones of the valves 80, 82, 84 selected for actuation at a time, in which case, the appropriate control devices would be configured to have the same address.

The hydraulic schematic of FIG. 3 graphically demonstrates one of the advantages of the present method over prior hydraulic control methods. That is, relatively few simple conventional hydraulic components are used to control actuation of multiple well tools, without the need for complex unreliable mechanisms or electricity. As illustrated in FIG. 3, only check valves, relief valves and pilot operated valves, which are described in further detail below, are used in the control devices 74, 76, 78.

Control device 74 includes check valves 92, 94, relief valves 96, 98, and normally open conventional pilot operated valves 100, 102, 104, 106. Dashed lines are used in FIG. 3 to indicate connections between the hydraulic lines A, B, C and pilot inputs of the pilot operated valves. For example, hydraulic line A is connected to the pilot inputs of the pilot operated valves 102 and 106. The pilot operated valves 100, 102, 104, 106 are configured so that, when the predetermined pressure level is on the corresponding hydraulic line connected to its pilot input, the valve is operated. Thus, when the predetermined pressure level is on hydraulic line A, valves 102 and 106 open; when the predetermined pressure level is on hydraulic line B, valve 100 opens; and when the predetermined pressure level is on hydraulic line C, valve 104 opens. Of course, if one of the valves 100, 102, 104, 106 is a normally open valve, then the valve would close when the predetermined pressure level is at its pilot input.

To select the valve 80 for actuation to an open configuration, the code 001 is generated on the hydraulic lines A, B, C by generating the predetermined pressure level, 1,000 psi, on hydraulic line C. Note that pilot operated valves 100 and 102 remain open, since pressure is not applied to hydraulic lines A and B, and the pressure on hydraulic line C is transmitted through those pilot operated valves and through check valve 92 to a passage 108 leading to the actuator 86.

The pressure on hydraulic line C is, thus, applied to one side of a piston in the actuator 86. The other side of the actuator 86 piston is connected via a passage 110 to the control device 74. Note that the passages 108, 110 are analogous to the passages 70 of the valve assembly 50 depicted in FIG. 2.

Fluid pressure in passage 110 is not transmitted through the control device 74 to the hydraulic line B, however, unless the pressure is great enough to be transmitted through the relief valve 98, due to the fact that pilot operated valve 104 is closed (because the predetermined fluid pressure is on hydraulic line C). Therefore, the actuator 86 piston is not permitted to displace unless fluid pressure in the passage 110 is great enough to be transmitted through the relief valve 98. Preferably, the relief valve 98 is configured so that it opens at a pressure greater than the predetermined fluid pressure used to transmit the code to the control devices 74, 76, 78. For example, if the predetermined fluid pressure is 1,000 psi, then the relief valve 98 may be configured to open at 1,500 psi. Thus, transmission of the code 001 to the control device 74 selects the valve 80 for actuation thereof, but does not result in the valve being actuated.

To actuate the valve 80 after the code 001 has been transmitted via the hydraulic lines A, B, C to the control device 74, fluid pressure on the hydraulic line C is increased above the predetermined fluid pressure. The increased fluid pressure is transmitted through the relief valve 98 and to the hydraulic line B, thereby permitting displacement of the actuator 86 piston. Displacement of the actuator 86 piston causes the valve 80 to open. Alternatively, the increased fluid pressure could be transmitted through the relief valve 98 and discharged into the well.

To recap the sequence of steps in opening the valve 80, the code 001 is generated on the hydraulic lines A, B, C (the predetermined fluid pressure existing only on hydraulic line C), and then fluid pressure on hydraulic line C is increased to open the valve.

The procedure is very similar to close the valve 80. The code 010 is generated on the hydraulic lines A, B, C (the predetermined fluid pressure existing only on hydraulic line B), thereby closing pilot operated valve 100, with pilot operated valves 102, 104 and 106 remaining open, and then fluid pressure on hydraulic line B is increased to close the valve. In the case of closing the valve 80, the fluid pressure on hydraulic line B is increased to permit its transmission through the relief valve 96 to hydraulic line C. Thus, the hydraulic lines A, B, C are used both to select the valve 80 for actuation thereof, and to supply fluid pressure to perform the actuation.

Note that, if any other codes are generated on the hydraulic lines A, B, C, the valve 80 is not selected for actuation thereof. For example, if the predetermined fluid pressure is generated on hydraulic line A, pilot operated valves 102 and 106 will close, preventing displacement of the actuator 86 piston. The pilot operated valves 100, 102, 104, 106 are configured, and their pilot inputs connected to appropriate ones of the hydraulic lines A, B, C, so that the valve 80 is selected for actuation thereof only when the correct code has been generated on the lines.

The control device 76 includes check valves 112, 114, relief valves 116, 118, normally open pilot operated valves 120, 122, 124, and normally closed pilot operated valve 126. The control device 76 has addresses 011 and 100 for opening and closing the valve 82, and its operation is similar to the operation of the control device 74 described above. When the code 011 is present on the hydraulic lines A, B, C (i.e., the predetermined pressure level is on lines B & C, but not on line A), pilot operated valves 120, 126 are open, permitting fluid pressure in hydraulic line B to be transmitted to the actuator 88. When the fluid pressure exceeds the opening pressure of the relief valve 118 (e.g., 1,500 psi), it is transmitted to hydraulic line A and the valve 82 is opened. When the code 100 is present on the hydraulic lines A, B, C, pilot operated valves 122, 124 are open, permitting fluid pressure in hydraulic line A to be transmitted to the actuator 88. When the fluid pressure exceeds the opening pressure of the relief valve 116, it is transmitted to hydraulic line B and the valve 82 is closed.

The control device 78 includes check valves 128, 130, relief valves 132, 134, normally open pilot operated valves 136, 138, and normally closed pilot operated valves 140, 142. The control device 78 has addresses 101 and 110 for opening and closing the valve 84. When the code 101 is present on the hydraulic lines A, B, C (i.e., the predetermined pressure level is on lines A & C, but not on line B), pilot operated valves 136, 140 are open, permitting fluid pressure in hydraulic line C to be transmitted to the actuator 90. When the fluid pressure exceeds the opening pressure of the relief valve 134 (e.g., 1,500 psi), it is transmitted to hydraulic line B and the valve 84 is opened. When the code 110 is present on the hydraulic lines A, B, C, pilot operated valves 138, 142 are open, permitting fluid pressure in hydraulic line B to be transmitted to the actuator 90. When the fluid pressure exceeds the opening pressure of the relief valve 132, it is transmitted to hydraulic line C and the valve 84 is closed.

The above description of the well control system embodiment of the present invention depicted in FIG. 3 illustrates the ease with which multiple tool assemblies may be controlled using digital hydraulics. In this example, valves 80, 82, 84 are either opened or closed, depending upon the pressure levels on the hydraulic lines A, B, C. However, it is to be clearly understood that the principles of the present invention may be used to perform other functions, such as to vary the configuration of a well tool. For example, the valve 80 could instead be a downhole choke and the level of pressure applied to the choke via the passages 180, 110 could be used to regulate the rate of fluid flow through the choke.

Referring additionally now to FIG. 4, another well control system hydraulic schematic embodying principles of the present invention is representatively illustrated. The hydraulic schematic shown in FIG. 4 is similar in many respects to the hydraulic schematic shown in FIG. 3, but is different in at least two aspects, in that there are seven actuators 144, 146, 148, 150, 152, 154, 156 controlled by respective control devices 158, 160, 162, 164, 166, 168, 170, and in that there are four hydraulic lines A, B, C, D instead of three. Note that well tools actuated by the actuators 144, 146, 148, 150, 152, 154, 156 are not shown in FIG. 4, but it is to be understood that in actual practice a well tool is connected to each of the actuators as described above.

It will be readily appreciated by one skilled in the art that the use of an additional hydraulic line D permits the control of additional well tools, or the use of additional functions with fewer well tools, due to the fact that additional distinct digital hydraulic codes may be on the hydraulic lines. For the example illustrated in FIG. 4, the following table shows the manner in which the actuators 144, 146, 148, 150, 152, 154, 156 may be selected using the addresses:

| Address A B C D | Actuation |
|---|---|
| 0 0 0 1 | Displace Actuator 144 Piston to the Right |
| 0 0 1 0 | Displace Actuator 144 Piston to the Left |
| 0 0 1 1 | Displace Actuator 146 Piston to the Right |
| 0 1 0 0 | Displace Actuator 146 Piston to the Left |
| 0 1 0 1 | Displace Actuator 148 Piston to the Right |
| 0 1 1 0 | Displace Actuator 148 Piston to the Left |
| 0 1 1 1 | Displace Actuator 150 Piston to the Right |
| 1 0 0 0 | Displace Actuator 150 Piston to the Left |
| 1 0 0 1 | Displace Actuator 152 Piston to the Right |
| 1 0 1 0 | Displace Actuator 152 Piston to the Left |
| 1 0 1 1 | Displace Actuator 154 Piston to the Right |
| 1 1 0 0 | Displace Actuator 154 Piston to the Left |
| 1 1 0 1 | Displace Actuator 156 Piston to the Right |
| 1 1 1 0 | Displace Actuator 156 Piston to the Left |

Of course, displacement of an actuator piston to the right may be used to open a valve and displacement of an actuator piston to the left may be used to close a valve, as described above, or the piston displacements may be used for other purposes or in controlling other types of well tools. Additionally, note that each control device 158, 160, 162, 164, 166, 168, 170 has two distinct addresses, but in practice more than one control device may have the same address, a control device may have a number of addresses other than two, etc.

Operation of the well control system of FIG. 4 is very similar to operation of the well control system of FIG. 3 described above. Therefore, only the operation of the control device 158 will be described in detail below, it being understood that the other control devices 160, 162, 164, 166, 168, 170 are operated in very similar manners, which will be readily apparent to one skilled in the art.

The control device 158 includes check valves 172, 174, relief valves 176, 178 and normally open pilot operated valves 180, 182,184, 186, 188, 190. The control device 158 has addresses 0101 and 0110 for operating the actuator 144. When the code 0101 is present on the hydraulic lines A, B, C, D (i.e., the predetermined pressure level is on lines B & D, but not on lines A or C), pilot operated valves 180, 182, 184 are open, permitting fluid pressure in hydraulic line D to be transmitted to the actuator 144. When the fluid pressure exceeds the opening pressure of the relief valve 178 (e.g., 1,500 psi), it is transmitted to hydraulic line C and the actuator 144 piston is displaced to the right. When the code 0110 is present on the hydraulic lines A, B, C, D, pilot operated valves 186, 188, 190 are open, permitting fluid pressure in hydraulic line C to be transmitted to the actuator 144. When the fluid pressure exceeds the opening pressure of the relief valve 176, it is transmitted to hydraulic line D and the actuator 144 piston is displaced to the left.

Thus, the well control system of FIG. 4 demonstrates that any number of hydraulic lines may be utilized to control any number of well tool assemblies, without departing from the principles of the present invention.

Referring additionally now to FIG. 5, another well control system hydraulic schematic is representatively illustrated. The well control system of FIG. 5 is similar in many respects to those depicted in FIGS. 3 & 4 and described above, but differs in at least two substantial aspects in that the hydraulic lines used to select well tool assemblies for actuation thereof are not the same as the hydraulic lines used to deliver fluid pressure to the actuators, and in that each control device has only one address.

The well control system of FIG. 5 utilizes three hydraulic lines A, B, C to select from among eight control devices 192, 194, 196, 198, 200, 202, 204, 206 for actuation of eight respective actuators 208, 210, 212, 214, 216, 218, 220, 222. As with the well control system of FIG. 4 described above, well tools are not shown in FIG. 5, it being understood that the actuators 208, 210, 212, 214, 216, 218, 220, 222 are connected to well tools in actual practice.

Note that the control devices 192, 194, 196, 198, 200, 202, 204, 206 as depicted in FIG. 5 do not include relief valves and, thus, are somewhat less complex as compared to the well control systems of FIGS. 3 & 4. This is due to the fact that there is no need to discriminate in the control devices 192, 194, 196, 198, 200, 202, 204, 206 between the predetermined pressure level needed to address one or more of the control devices and the pressure level needed to operate the actuators 208, 210, 212, 214, 216, 218, 220, 222. Instead, the predetermined pressure level needed to address the control devices 192, 194, 196, 198, 200, 202, 204, 206 is delivered via a source (hydraulic lines A, B, C) different from the source (hydraulic lines D, E) of fluid pressure used to operate the actuators 208, 210, 212, 214, 216, 218, 220, 222. The control devices 192, 194, 196, 198, 200, 202, 204, 206 also do not include check valves, since there is no need to direct fluid flow through relief valves.

The following table shows how pressure levels in the hydraulic lines A, B, C, D, E may be used to control operation of the actuators 208, 210, 212, 214, 216, 218, 220, 222:

| Address A B C | Actuation D E | |
|---|---|---|
| 0 0 0 | 1 0 | Displace Actuator 208 Piston to the Right |
| | 0 1 | Displace Actuator 208 Piston to the Left |
| 0 0 1 | 1 0 | Displace Actuator 210 Piston to the Right |
| | 0 1 | Displace Actuator 210 Piston to the Left |
| 0 1 0 | 1 0 | Displace Actuator 212 Piston to the Right |
| | 0 1 | Displace Actuator 212 Piston to the Left |
| 0 1 1 | 1 0 | Displace Actuator 214 Piston to the Right |
| | 0 1 | Displace Actuator 214 Piston to the Left |
| 1 0 0 | 1 0 | Displace Actuator 216 Piston to the Right |
| | 0 1 | Displace Actuator 216 Piston to the Left |
| 1 0 1 | 1 0 | Displace Actuator 218 Piston to the Right |
| | 0 1 | Displace Actuator 218 Piston to the Left |
| 1 1 0 | 1 0 | Displace Actuator 220 Piston to the Right |
| | 0 1 | Displace Actuator 220 Piston to the Left |
| 1 1 1 | 1 0 | Displace Actuator 222 Piston to the Right |
| | 0 1 | Displace Actuator 222 Piston to the Left |

Note that the notation used in the above table differs somewhat as compared to the other tables discussed above in relation to FIGS. 3 & 4. As before, the "1" and "0" for the address hydraulic lines A, B, C indicate the presence and absence, respectively, of a predetermined pressure level on those hydraulic lines. However, the "1" and "0" for the actuation hydraulic lines D, E indicate greater and lesser pressure levels, respectively, as compared to each other. For example, when the hydraulic line D has a "1" indication and the hydraulic line E has a "0" indication in the above table, this means that the pressure level in hydraulic line D is greater than the pressure level in hydraulic line E. Conversely, when the hydraulic line E has a "1" indication and the hydraulic line D has a "0" indication, this means that the pressure level in hydraulic line E is greater than the pressure level in hydraulic line D.

When a particular control device 192, 194, 196, 198, 200, 202, 204 or 206 has been selected by generating its associated address on the hydraulic lines A, B, C, a difference in pressure level between the hydraulic lines D, E is used to operate the corresponding actuator 208, 210, 212, 214, 216, 218, 220 or 222. The difference in pressure level between the hydraulic lines D, E operates the corresponding actuator 208, 210, 212, 214, 216, 218, 220 or 222 because one of the hydraulic lines is connected to one side of the actuator piston and the other hydraulic line is connected to the other side of the actuator piston. Thus, it is not necessary for the pressure level on either of the hydraulic lines D, E to be the predetermined pressure level used to address the control devices 192, 194, 196, 198, 200, 202, 204, 206 via the hydraulic lines A, B, C, but the pressure level on either of the hydraulic lines D, E could be the predetermined pressure level, and this may be preferable in certain circumstances, such as in offshore operations where only a single pressure level may be available for both the addressing and actuation functions of the hydraulic lines.

Since operation of the control devices 192, 194, 196, 198, 200, 202, 204, 206 is similar in most respects to the operation of the control devices in the well control systems of FIGS. 3 & 4 described above, the operation of only one of the control devices 200 will be described below, it being understood that the other control devices 192, 194, 196, 198, 202, 204, 206 are operated in very similar manners, which will be readily apparent to one skilled in the art.

The control device 200 includes normally open pilot operated valves 224, 226, 228, 230 and normally closed pilot operated valves 232, 234. The control device 200 has address 100 for operating the actuator 216. When the code 100 is present on the hydraulic lines A, B, C (i.e., the predetermined pressure level is on line A, but not on lines B or C), pilot operated valves 224, 228, 232 are open, permitting a pressure level in hydraulic line D to be transmitted to the actuator 216. Pilot operated valves 226, 230, 234 are also open, permitting a pressure level in hydraulic line E to be transmitted to the actuator 216. If the pressure level in hydraulic line D is greater than the pressure level in hydraulic line E, the actuator 216 piston is displaced to the right, and if the pressure level in hydraulic line E is greater than the pressure level in hydraulic line D, the actuator 216 piston is displaced to the left.

Thus, the well control system of FIG. 5 demonstrates that different hydraulic lines may be used in addressing the control devices 192, 194, 196, 198, 200, 202, 204, 206 and operating the actuators 208, 210, 212, 214, 216, 218, 220, 222, and that the control devices do not necessarily have two addresses each. It will also be readily appreciated by one skilled in the art that the hydraulic lines D, E are similar to control and balance lines used to control actuation of, for example, subsea test valves. That is, the hydraulic lines D, E are connected to opposing areas of a piston, and fluid pressure applied to one of the lines will result in fluid being displaced in the other line (when the lines are operatively connected to an actuator), so that fluid "U-tubes" in the lines. However, it is to be clearly understood that it is not necessary for actuating hydraulic lines to "U-tube" in this manner. For example, fluid from the actuators 208, 210, 212, 214, 216, 218, 220, 222 may be discharged into the well, as described above.

Referring additionally now to FIG. 6, another well control system hydraulic schematic is representatively illustrated. The well control system of FIG. 6 is similar in many respects to the well control system of FIG. 5, but differs in at least one respect in that fluid pressure used to operate an actuator is delivered by only one hydraulic line D, with other hydraulic lines A, B, C being used to select from among control devices and to provide a balance line for operation of the selected actuator.

The well control system of FIG. 6 includes three control devices 238, 240, 242 and three corresponding actuators 244, 246, 248. As with the well control systems of FIGS. 4 & 5 described above, the actuators 244, 246, 248 are shown apart from the remainder of their respective well tool assemblies, but it is to be understood that each of the actuators is preferably connected to a well tool, such as a valve, in actual practice.

Each of the control devices 238, 240, 242 has two addresses. Of course, it is not necessary for each of the control devices 238, 240, 242 to have two addresses, or for each address to be distinct from the other addresses used. The following table lists the addresses used in the well control system of FIG. 5, and the corresponding mode of operation of the selected actuator:

| Address A B C | Actuation |
|---|---|
| 0 0 1 | Displace Actuator 244 Piston to the Right |
| 0 1 0 | Displace Actuator 244 Piston to the Left |
| 0 1 1 | Displace Actuator 246 Piston to the Right |
| 1 0 0 | Displace Actuator 246 Piston to the Left |
| 1 0 1 | Displace Actuator 248 Piston to the Right |
| 1 1 0 | Displace Actuator 248 Piston to the Left |

Note that the hydraulic line D is not listed in the above table. Hydraulic line D supplies fluid pressure to operate a selected one of the actuators 244, 246, 248 when the actuator has been selected for operation thereof. Thus, if code 001 is generated on the hydraulic lines A, B, C, the actuator 244 is selected and fluid pressure on the hydraulic line D is used to displace the actuator's piston. Therefore, it will be readily appreciated that the actuator piston displacements listed in the above table do not actually occur unless fluid pressure exists on hydraulic line D. The fluid pressure on the hydraulic line D used to displace an actuator piston may or may not be the same as the predetermined pressure level on the hydraulic lines A, B and/or C used to select from among the control devices 238, 240, 242 for operation of the corresponding actuator 244, 246 and/or 248.

Since the hydraulic schematic of FIG. 6 is similar in many respects to hydraulic schematics described above, the operation of only one of the control devices 242 will be described below, it being understood that the other control devices 238, 240 are operated in very similar manners, which will be readily apparent to one skilled in the art.

The control device 242 includes check valves 250, 252, normally open pilot operated valves 256, 260 and normally closed pilot operated valves 254, 258, 262, 264. When the address 101 is generated on the hydraulic lines A, B, C, pilot operated valves 254, 256, 258 are open, thereby permitting fluid communication between the hydraulic line D and the left side of the actuator 248 piston. The right side of the actuator 248 piston is in fluid communication with the hydraulic line B via the check valve 252. Note that the pilot operated valves 260, 262 are closed at this point, preventing fluid communication between the hydraulic line D and the right side of the actuator 248 piston. Fluid pressure in the hydraulic line D may now be used to displace the actuator 248 piston to the right.

When the address 110 is generated on the hydraulic lines A, B, C, pilot operated valves 260, 262, 264 are open, thereby permitting fluid communication between the hydraulic line D and the right side of the actuator 248 piston. The left side of the actuator 248 piston is in fluid communication with the hydraulic line C via the check valve 250. Note that the pilot operated valves 254, 256 are closed at this point, preventing fluid communication between the hydraulic line D and the left side of the actuator 248 piston. Fluid pressure in the hydraulic line D may now be used to displace the actuator 248 piston to the left.

Thus, the well control system of FIG. 6 demonstrates that although a separate hydraulic actuation line may be used to operate an actuator, the hydraulic actuation line may be "U-tubed" or balanced via one of the hydraulic address lines used to select a control device for operation of the actuator.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. For example, the above examples of embodiments of the present invention have utilized only one predetermined pressure level in selecting one or more control devices for actuation of a corresponding well tool, but it will be readily appreciated that multiple predetermined pressure levels may be used to select a control device, such as by using pilot operated valves which operate in response to different fluid pressures on their pilot inputs. Accordingly, the foregoing detailed description is to be clearly understood as being given by way of illustration and example only, the spirit and scope of the present invention being limited solely by the appended claims.

What is claimed is:

1. A method of hydraulically controlling multiple well tools in a well, each well tool having an actuator operatively associated therewith, the method comprising the steps of:

interconnecting each of a plurality of addressable control devices to a different one of the actuators;

interconnecting each of a first plurality of hydraulic lines to each of the addressable control devices; and selecting at least one of the tools for actuation thereof by generating a first code on the first hydraulic lines.

2. The method according to claim 1, wherein in the selecting step, the first code comprises a combination of pressure levels on the first hydraulic lines.

3. The method according to claim 2, wherein in the selecting step, each of the first hydraulic lines has one of the pressure levels thereon.

4. The method according to claim 2, wherein in the selecting step, at least one of the pressure levels of the first code is an absence of applied pressure.

5. The method according to claim 2, wherein the combination of pressure levels comprises a first pressure level on at least one of the first hydraulic lines, and a second pressure level on the remainder of the first hydraulic lines.

6. The method according to claim 2, wherein the combination of pressure levels comprises a first pressure level on at least one of the first hydraulic lines, a second pressure level on at least one of the first hydraulic lines, and a third pressure level on the remainder of the first hydraulic lines.

7. The method according to claim 1, wherein the method further comprises the step of actuating the selected tool utilizing fluid pressure on at least one of the first hydraulic lines.

8. The method according to claim 1, wherein the method further comprises the step of actuating the selected tool utilizing fluid pressure on at least one second hydraulic line interconnected to each of the tools.

9. The method according to claim 1, wherein the selecting step further comprises decoding the first code utilizing an addressable actuation control device interconnected to the first hydraulic lines and to an actuator for the tool.

10. The method according to claim 9, wherein the decoding step further comprises opening a first fluid communication path between at least one of the first hydraulic lines and the actuator in response to the first code matching a first address of the control device.

11. A method of hydraulically controlling multiple well tools in a well, the method comprising the steps of:

interconnecting a first plurality of hydraulic lines to each of the tools; and selecting at least one of the tools for actuation thereof by generating a first code on the first hydraulic lines, the selecting step comprising decoding the first code utilizing an addressable actuation control device interconnected to the first hydraulic lines and to an actuator for the tool, the decoding step further comprising opening a first fluid communication path between at least one of the first hydraulic lines and the actuator in response to the first code matching a first address of the control device, the decoding step further comprising opening a second fluid communication path between another of the first hydraulic lines and the actuator in response to a second code on the first hydraulic lines, the second code matching a second address of the control device.

12. The method according to claim 9, wherein the decoding step further comprises opening a first fluid communication path between the actuator and at least one of a second plurality of hydraulic lines interconnected to each of the tools, in response to the first code matching a first address of the control device.

13. The method according to claim 12, wherein the decoding step further comprises opening a second fluid communication path between another of the second hydraulic lines and the actuator, in response to a second code on the first hydraulic lines, the second code matching a second address of the control device.

14. A method of controlling multiple hydraulically actuated well tool assemblies, each of the well tool assemblies including a well tool, a hydraulic actuator for operating the well tool and an addressable actuation control device, the method comprising the steps of:

interconnecting each of multiple first hydraulic lines to each of the control devices; and transmitting a first address of at least one of the control devices via the first hydraulic lines, thereby selecting at least one of the well tools for actuation thereof.

15. The method according to claim 14, further comprising the step of selecting a second well tool for actuation thereof by transmitting a second address of the first control device via the first hydraulic lines.

16. The method according to claim 14, wherein in the transmitting step, the first address corresponds to a combination of pressure levels on the first hydraulic lines, each of the hydraulic lines having one of the pressure levels thereon.

17. The method according to claim 16, wherein in the transmitting step, at least one of the pressure levels corresponds to an absence of externally applied fluid pressure.

18. The method according to claim 14, further comprising the step of actuating the well tool by manipulating fluid pressure on a first one of the first hydraulic lines after the transmitting step.

19. A method of controlling multiple hydraulically actuated well tool assemblies, each of the well tool assemblies including a well tool, a hydraulic actuator for operating the well tool and an addressable actuation control device, the method comprising the steps of:

interconnecting multiple first hydraulic lines to each of the control devices;

transmitting a first address of at least one of the control devices via the first hydraulic lines, thereby selecting at least one of the well tools for actuation thereof; and actuating the well tool by manipulating fluid pressure on a first one of the first hydraulic lines after the transmitting step, the actuating step further comprising receiving fluid from a respective first one of the actuators into a second one of the first hydraulic lines.

20. The method according to claim 19, wherein in the receiving step, the second one of the first hydraulic lines is a line to which fluid pressure was not applied in the transmitting step.

21. The method according to claim 14, further comprising the step of permitting fluid communication between at least one of the first hydraulic lines and the respective actuator of the at least one well tool in response to the transmitting step.

22. The method according to claim 14, further comprising the step of permitting fluid communication between a second hydraulic line and the respective actuator of the at least one well tool, in response to the transmitting step.

23. The method according to claim 14, wherein in the transmitting step, only one of the well tools is selected for actuation thereof in response to transmission of the first address.

24. A method of controlling multiple hydraulically actuated well tool assemblies, each of the well tool assemblies including a well tool, a hydraulic actuator for operating the well tool and an addressable actuation control device, the method comprising the steps of:

interconnecting multiple first hydraulic lines to each of the control devices;

transmitting a first address of at least one of the control devices via the first hydraulic lines, thereby selecting at least one of the well tools for actuation thereof, in the transmitting step only one of the well tools being selected for actuation thereof in response to transmission of the first address; and transmitting a second address of the control device of the selected well tool, thereby selecting the well tool for actuation thereof in a first manner different from a second manner in which the selected well tool was selected for actuation in response to transmission of the first address.

25. The method according to claim 14, wherein in the transmitting step, all of the well tools are selected for actuation thereof in response to transmission of the first address.

26. A method of controlling multiple hydraulically actuated well tool assemblies, each of the well tool assemblies including a well tool, a hydraulic actuator for operating the well tool and an addressable actuation control device, the method comprising the steps of:

interconnecting multiple first hydraulic lines to each of the control devices;

transmitting a first address of at least one of the control devices via the first hydraulic lines, thereby selecting at least one of the well tools for actuation thereof, in the transmitting step all of the well tools being selected for actuation thereof in response to transmission of the first address and transmitting via the first hydraulic lines a second address of the respective control device of at least one of the well tools, thereby selecting at least one of the well tools for actuation thereof in a second manner different from a first manner in which the well tools were selected for actuation in response to transmission of the first address.

27. A well tool control system, comprising:

multiple well tool assemblies, each assembly including a well tool, an actuator attached to the well tool for actuation thereof and an addressable actuation control device; and multiple first hydraulic lines each being interconnected to each control device, the first hydraulic lines transmitting addresses to respective selected ones of the control devices and thereby selecting corresponding respective ones of the well tools for actuation thereof.

28. The system according to claim 27, wherein each of the addresses corresponds to a combination of fluid pressures on the first hydraulic lines.

29. The system according to claim 27, wherein each of the addresses corresponds to static pressure levels on the first hydraulic lines.

30. The system according to claim 29, wherein in each of the addresses, the static pressure level on at least one of the first hydraulic lines is different from the static pressure level on another of the first hydraulic lines.

31. The system according to claim 27, wherein fluid communication is permitted between at least one of the first hydraulic lines and corresponding actuators of selected well tools in response to transmission of the addresses to the selected control devices.

32. The system according to claim 31, wherein increase in fluid pressure applied to the at least one of the first hydraulic lines after transmission of the addresses causes the selected actuators to operate the corresponding selected well tools.

33. The system according to claim 27, wherein fluid communication is permitted between at least one second hydraulic line interconnected to each of the control devices and corresponding actuators of selected well tools in response to transmission of the addresses to the selected control devices.

34. The system according to claim 33, wherein increase in fluid pressure applied to the at least one of the second hydraulic lines after transmission of the addresses causes the selected actuators to operate the corresponding selected well tools.

35. A well control system, comprising:

at least first, second and third hydraulic lines;

a first well tool assembly including a first well tool, a first actuator attached to the first well tool, and a first addressable actuation control device connected to the first, second and third hydraulic lines, the first well tool assembly being selected for operation of the first well tool in a first manner when a first combination of different pressure levels, including at least a first predetermined pressure level on the first hydraulic line, a second predetermined pressure level on the second hydraulic line and a third predetermined pressure level on the third hydraulic line, corresponds to a first address on the first control device.

36. The system according to claim 35, wherein fluid pressure from at least one of the first, second and third hydraulic lines is utilized in the first actuator to operate the first well tool.

37. The system according to claim 36, wherein an increase in fluid pressure on the at least one of the first, second and third hydraulic lines, after selection of the first well tool assembly, permits the fluid pressure in the first actuator to operate the first well tool.

38. The system according to claim 36, wherein the first control device permits fluid communication between the actuator and the at least one of the first, second and third hydraulic lines in response to the first combination of pressure levels.

39. The system according to claim 35, wherein fluid pressure from a fourth hydraulic line is utilized in the actuator to operate the first well tool.

40. The system according to claim 39, wherein the first control device permits fluid communication between the actuator and the fourth hydraulic line in response to the first combination of pressure levels.

41. A well control system, comprising:

at least first, second and third hydraulic lines; and a first well tool assembly including a first well tool, a first actuator attached to the first well tool, and a first addressable actuation control device connected to the first, second and third hydraulic lines, the first well tool assembly being selected for operation of the first well tool in a first manner when a first combination of pressure levels, including at least a first predetermined pressure level on the first hydraulic line, a second predetermined pressure level on the second hydraulic line and a third predetermined pressure level on the third hydraulic line, corresponds to a first address of the first control device, the first well tool assembly being selected for operation of the first well tool in a second manner when a second combination of pressure levels, including at least a fourth predetermined pressure level on the first hydraulic line, a fifth predetermined pressure level on the second hydraulic line and a sixth predetermined pressure level on the third hydraulic line, corresponds to a second address of the first control device.

42. The system according to claim 41, wherein the control device permits fluid communication between the first actuator and the first and second hydraulic lines to operate the first well tool in the first manner in response to the first combination of pressure levels, and the control device permits fluid communication between the first actuator and the first and third hydraulic lines to operate the first well tool in the second manner in response to the second combination of pressure levels.

43. The system according to claim 35, further comprising a second well tool assembly including a second well tool, a second actuator attached to the second well tool, and a second addressable actuation control device connected to the first, second and third hydraulic lines, the second well tool assembly being selected for operation of the second well tool when a second combination of pressure levels, including at least a fourth predetermined pressure level on the first hydraulic line, a fifth predetermined pressure level on the second hydraulic line and a sixth predetermined pressure level on the third hydraulic line, corresponds to a second address of the second control device.

44. The system according to claim 43, wherein the first and second addresses are the same.

45. The system according to claim 43, wherein the first and second addresses are different from each other.

* * * * *